(No Model.)

W. H. PACKHAM.
DAMPER.

No. 485,053. Patented Oct. 25, 1892.

WITNESSES:
J. H. Theberath.
C. Sedgwick

INVENTOR
W. H. Packham
BY Munn & Co
ATTORNEYS.

UNITED STATES PATENT OFFICE.

WILLIAM H. PACKHAM, OF BUFFALO, NEW YORK, ASSIGNOR OF ONE-HALF TO WILLIAM H. BRIGHT, OF SAME PLACE.

DAMPER.

SPECIFICATION forming part of Letters Patent No. 485,053, dated October 25, 1892.

Application filed August 4, 1891. Serial No. 401,680. (No model.)

*To all whom it may concern:*

Be it known that I, WILLIAM H. PACKHAM, of Buffalo, in the county of Erie and State of New York, have invented a new and Improved Damper, of which the following is a full, clear, and exact description.

My invention is an improvement in that class of stovepipe-dampers which are so constructed that the plate or disk composing the damper proper is drawn laterally or edgewise by spring-pressure into frictional contact with the inner side of the pipe and is thus held, so that it will remain fixed at any angle at which it may be adjusted.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
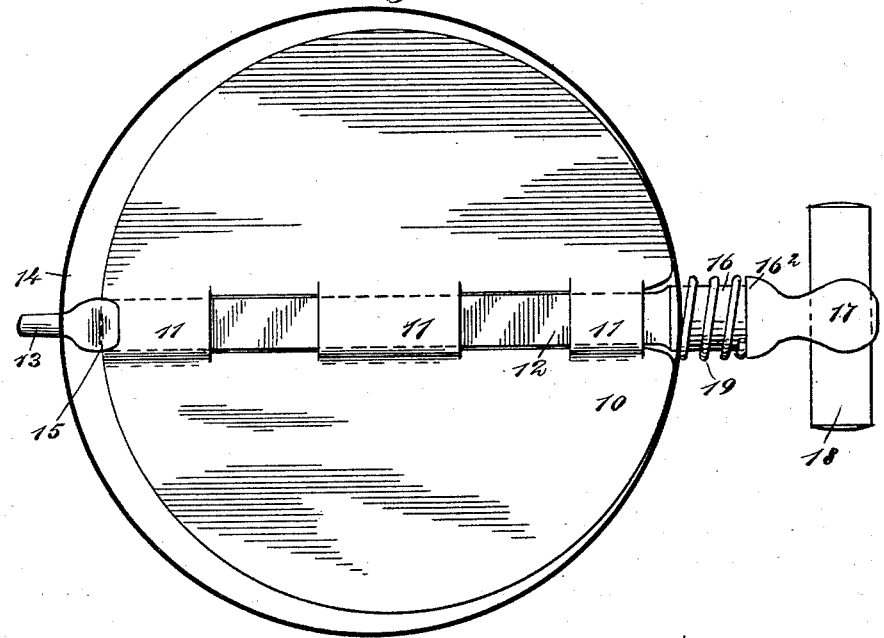
Figure 2:
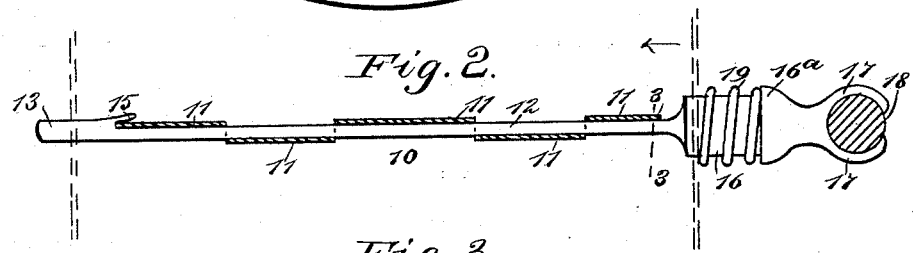
Figure 3:
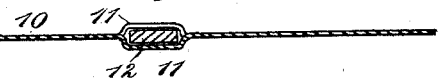
Figure 4:
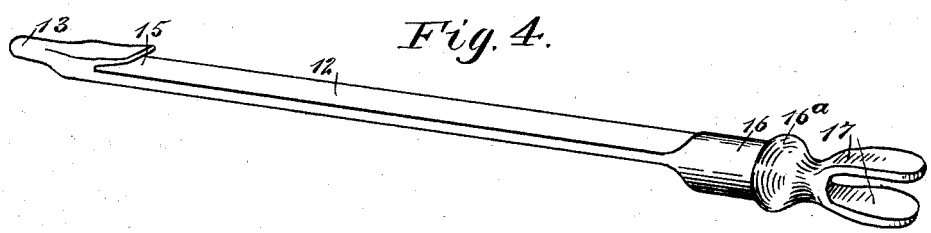

Figure 1 is a plan view of the damper, showing it in position in a pipe. Fig. 2 is a cross-section of the damper, taken on a line parallel with the damper-shank. Fig. 3 is a broken cross-section on the line 3 3 in Fig. 2, looking in the direction of the arrow; and Fig. 4 is an enlarged detail perspective view of the damper-shank.

The damper-plate 10 is shaped to fit the pipe in which it is to be used, and it is provided centrally with lugs 11, which are pressed alternately from opposite sides of the damper, so as to form a slideway to receive the shank 12, which shank has one end arranged to project beyond the damper-plate, said end being reduced, as shown at 13, so that it will fit an aperture in the pipe 14. Near the reduced end of the damper-shank 12 is a recess 15, which is produced on one side of the shank and is adapted to receive an edge of the damper-plate. Near the opposite end the shank 12 is enlarged and rounded, as shown at 16, so as to produce a suitable bearing-surface, and this rounded surface ends in a shoulder 16$^a$, which separates said rounded surface from the clasp 17, which is made of malleable metal, and has two parallel arms which are adapted to be pressed around the handle 18. It will thus be seen that no screws or rivets will be necessary to secure the handle in place, and consequently the damper will be cheapened in this respect.

A spiral spring 19 is coiled around the rounded surface 16 of the damper-shank, and this spring is compressed between the shoulder 16$^a$ and the pipe 14. To insert the shank in the damper-plate, it is simply pushed through the slideway formed by the oppositely-arranged lugs 11, and when the damper is in position in a pipe the pressure of the spring 19 will tend to withdraw the damper-shank, and consequently the damper-plate 10 will be pressed firmly into the recess 15. The damper-plate will thus be always in place and cannot by any possibility get loose.

The damper-plate is struck up out of sheet metal, and the construction of the shank and its easy means of attachment to the damper-plate renders the complete damper extremely cheap, and it is also very efficient. The lug formed by recessing the shank at 15 overhangs the pheripheral edge of the disk, and, being under the action of the spring, the lug is locked to the disk at all times, even against the tendency to become disengaged by the warping of the disk.

Having thus described my invention, I claim as new and desire to secure by Letters Patent—

As a new article of manufacture, the herein-described damper, consisting of the damper-disk having a slideway produced centrally therein, the shank 12, having at one end a stud forming a journal for one end thereof and recessed, as at 15, adjacent to the stud, said recess forming an integral overhanging lug or hook adapted to overlie the peripheral edge of the damper-disk received in the recess, the opposite end of the shank having a suitable handle and formed with a shoulder, and a coiled spring on the handle end of the shank, normally tending to press the overhanging lug at the recessed end of the shank into engagement with the peripheral edge of the disk, thereby serving to maintain the engagement of such lug irrespective of any warping of the disk, substantially as described.

WILLIAM H. PACKHAM.

Witnesses:
SEWARD A. SIMONS,
M. G. POTTER.